May 26, 1936.  W. T. ABEL  2,042,375
MACHINE FOR MAKING BUTTON BACKS AND THE LIKE
Filed Dec. 6, 1933  7 Sheets-Sheet 1
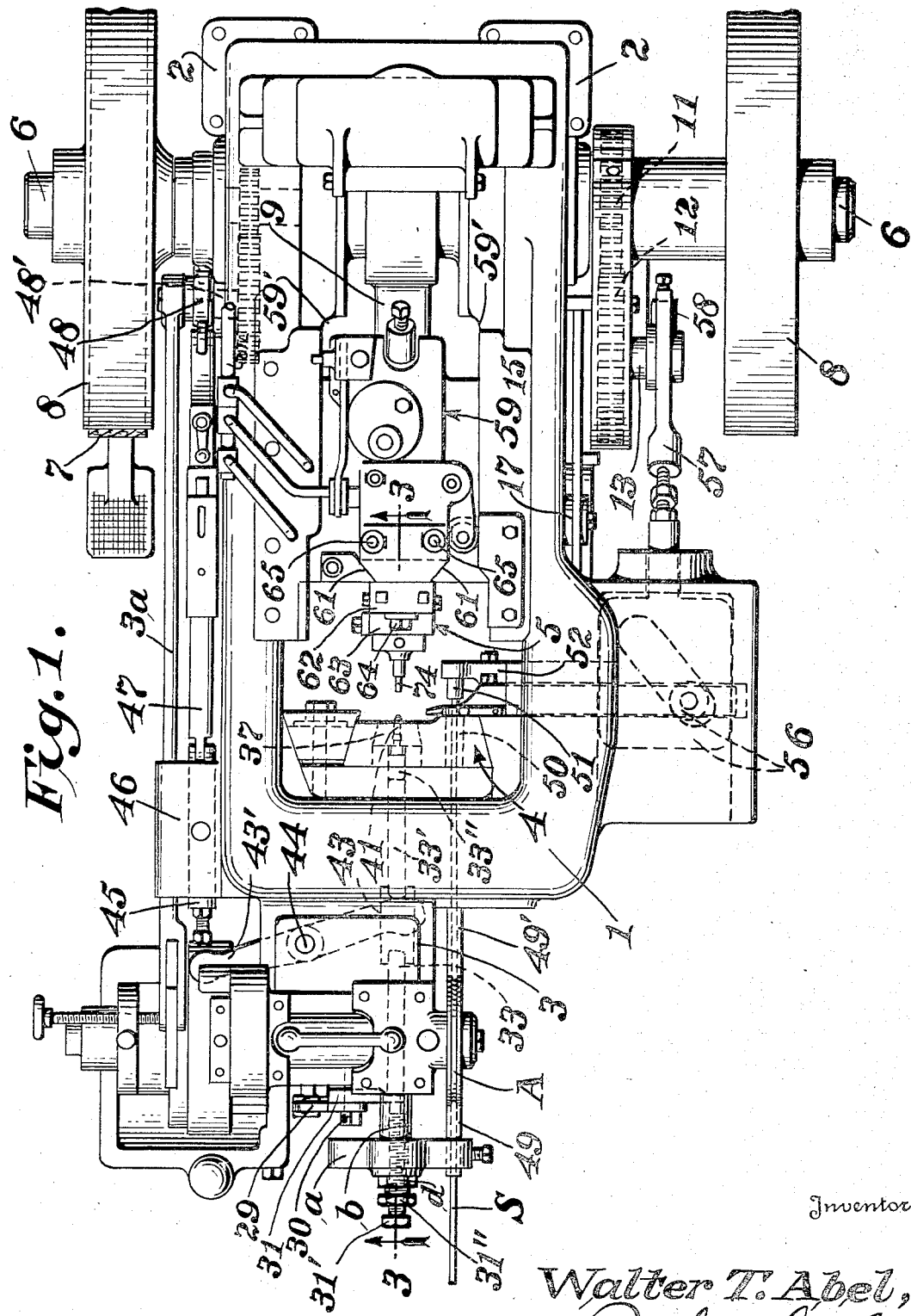
Inventor:
Walter T. Abel,
By Parker Cook,
Attorney

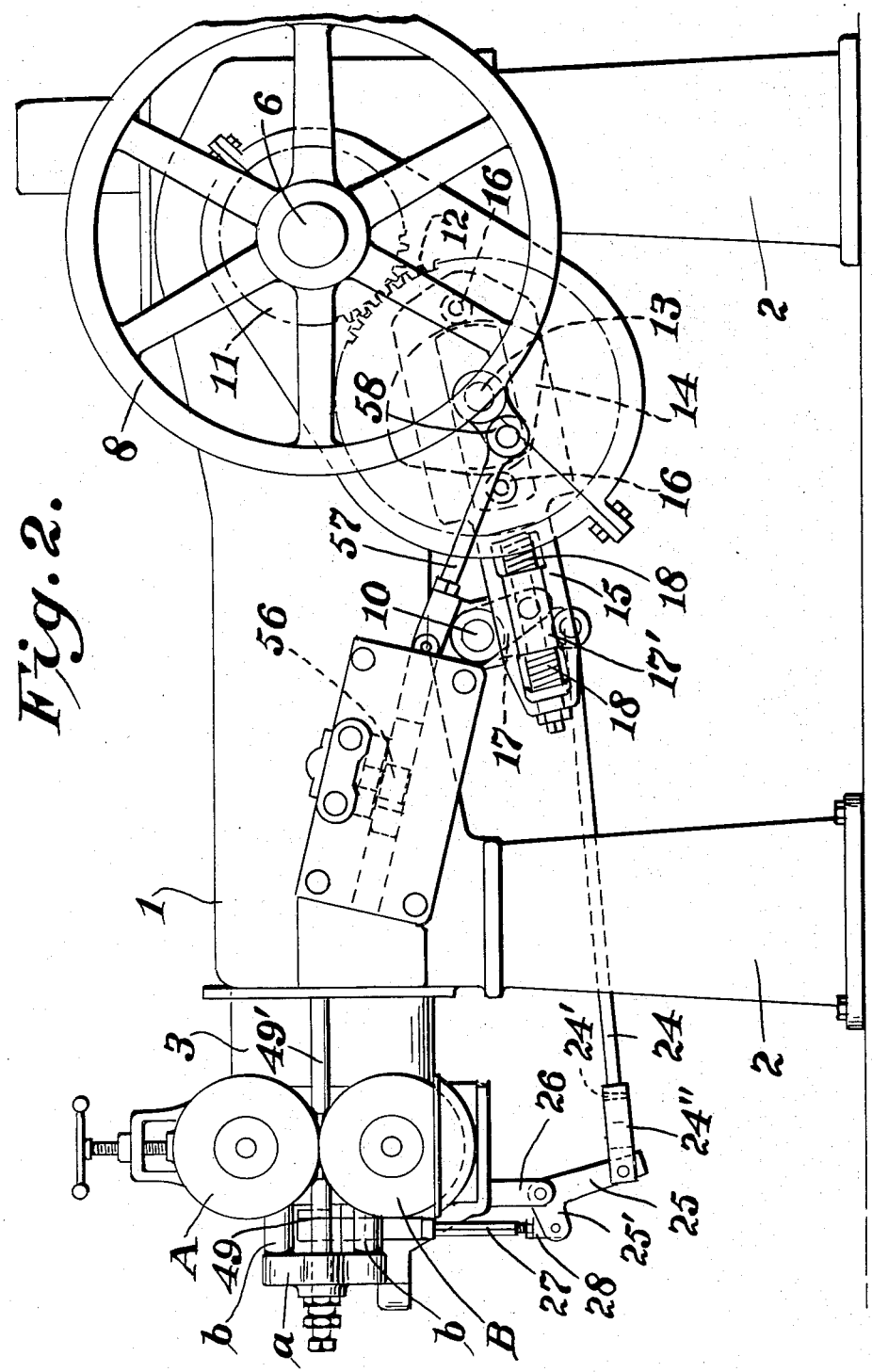

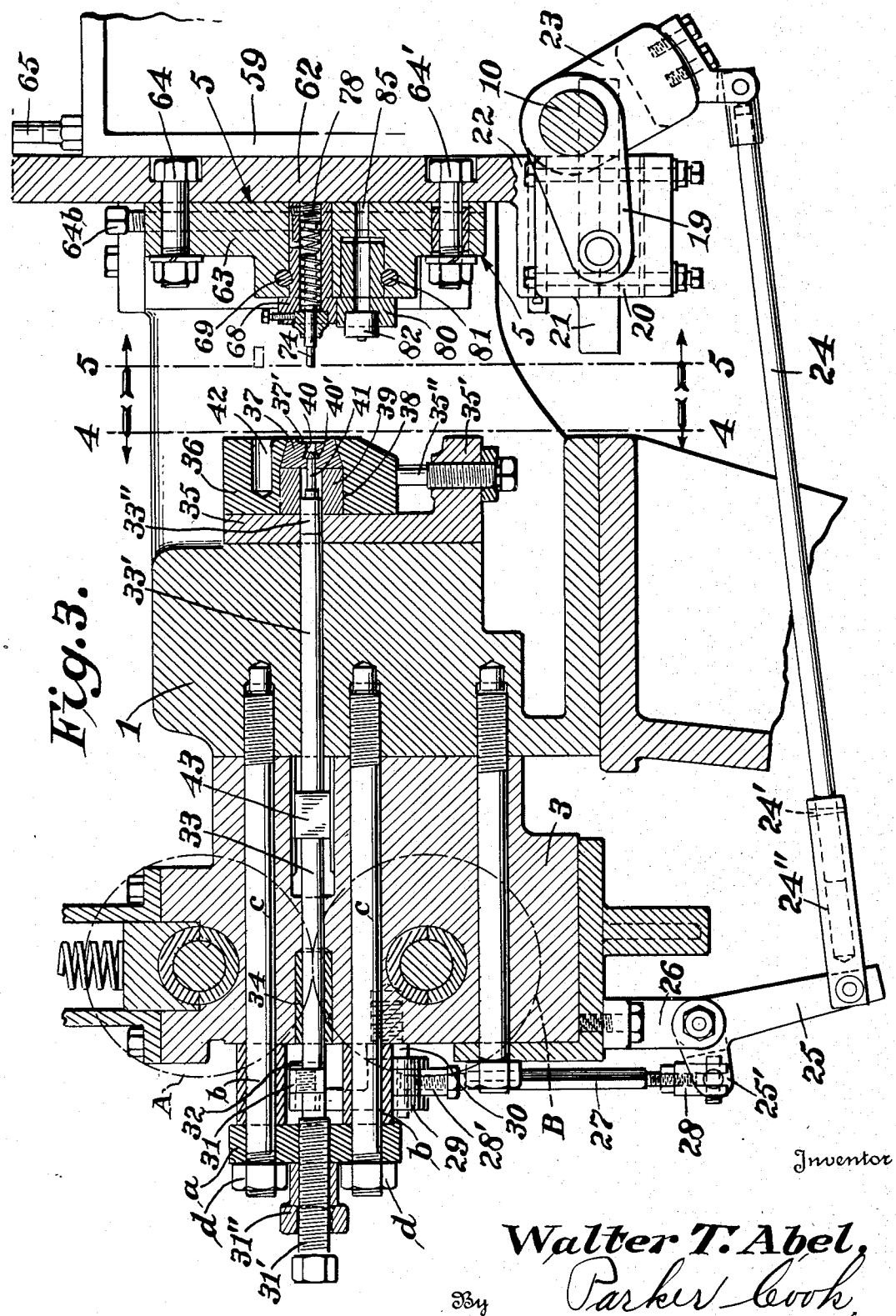

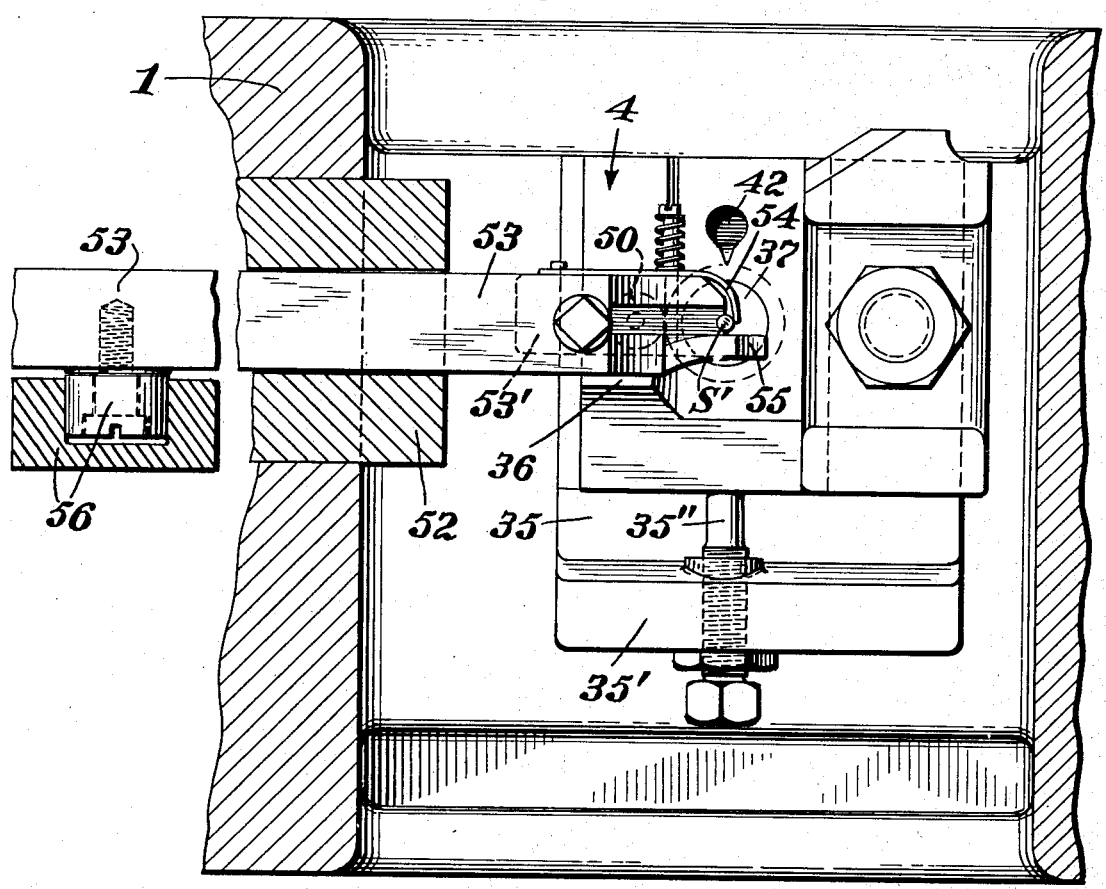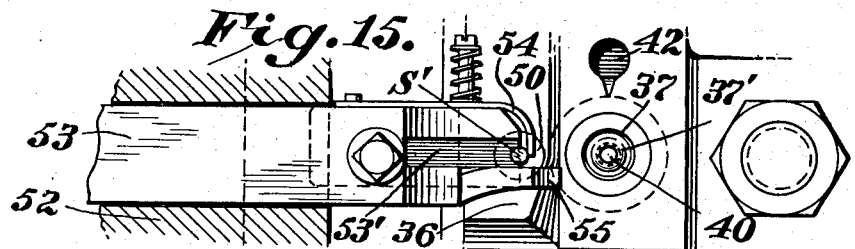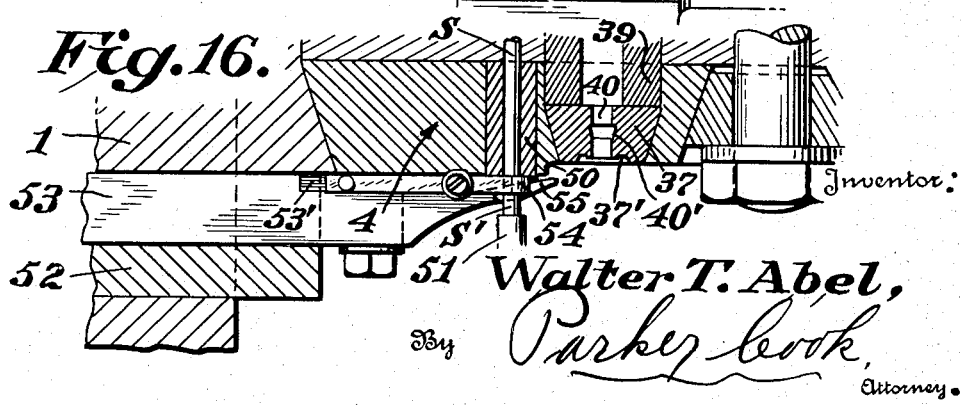

May 26, 1936. W. T. ABEL 2,042,375
MACHINE FOR MAKING BUTTON BACKS AND THE LIKE
Filed Dec. 6, 1933 7 Sheets-Sheet 5
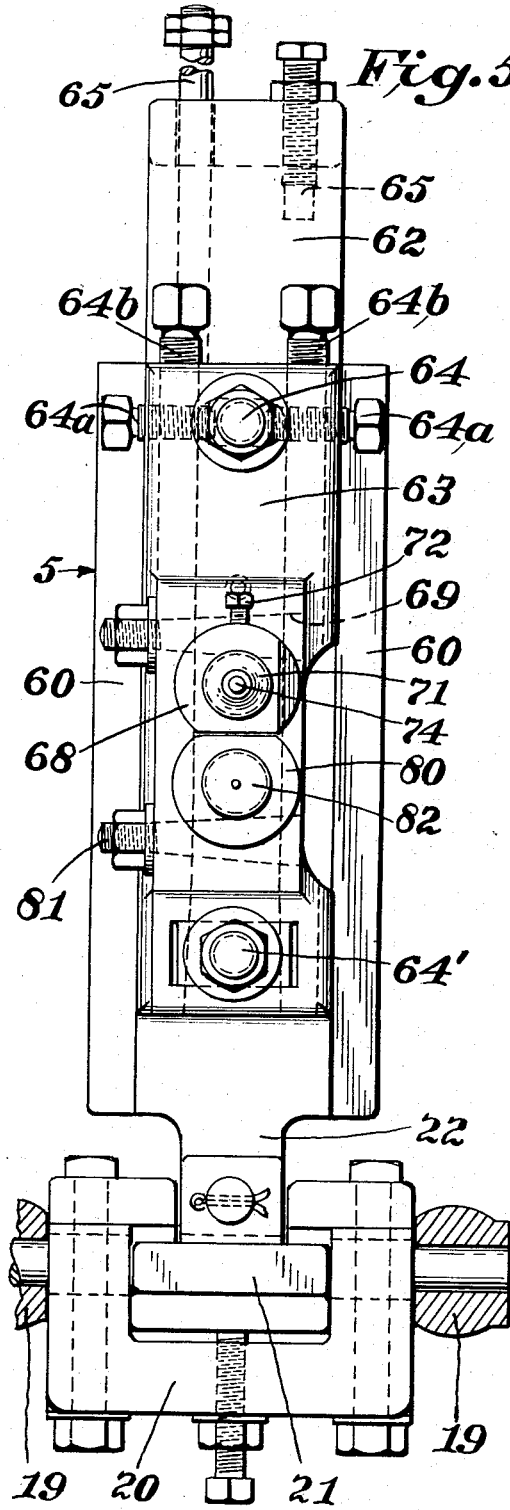
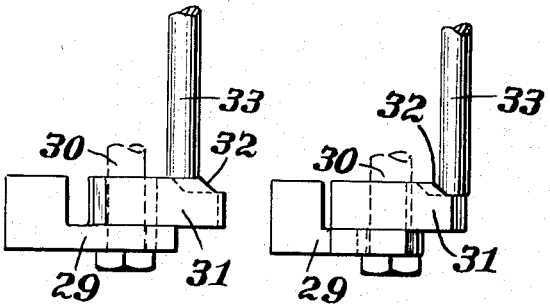
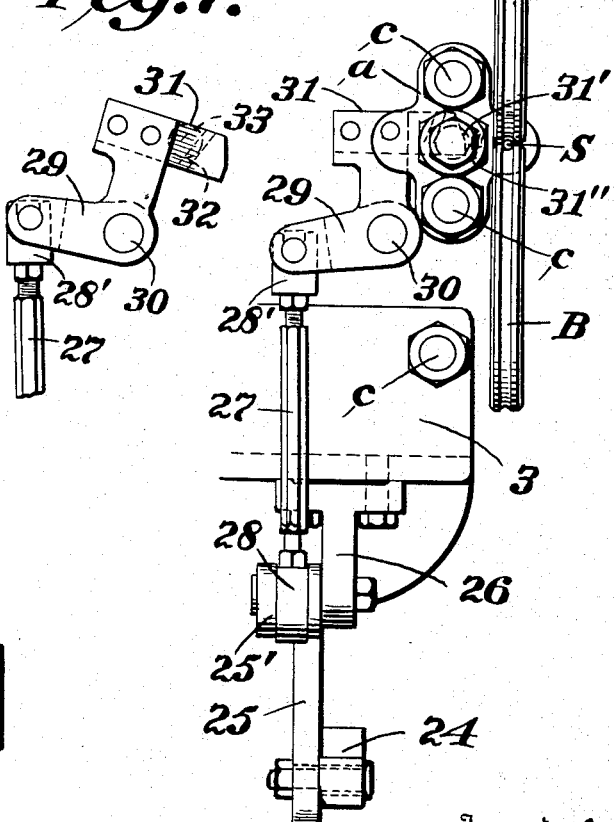
Inventor:
Walter T. Abel,
By Parky Cook
Attorney.

May 26, 1936.   W. T. ABEL   2,042,375
MACHINE FOR MAKING BUTTON BACKS AND THE LIKE
Filed Dec. 6, 1933   7 Sheets-Sheet 6
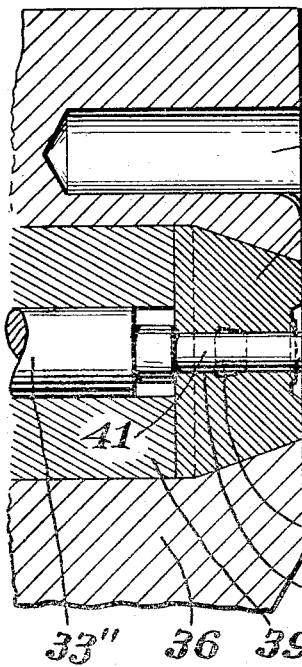
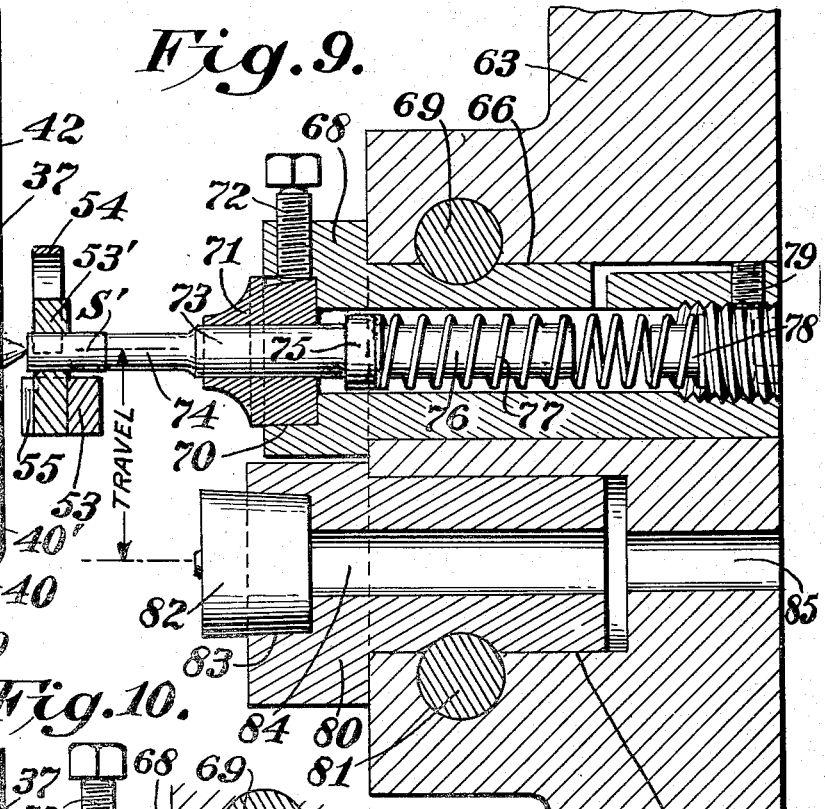
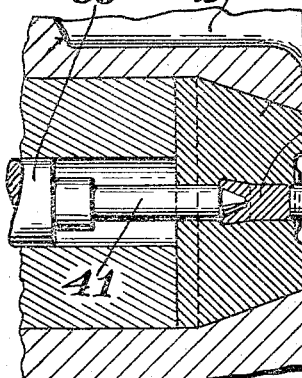
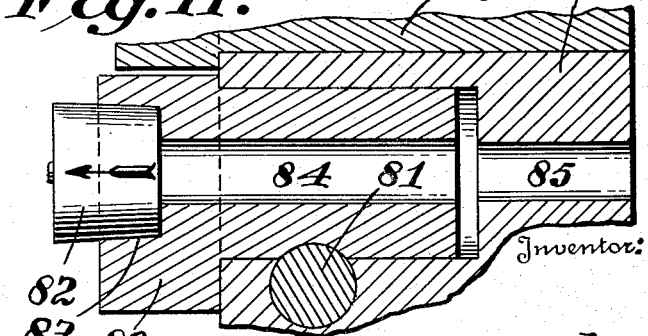
Inventor:
Walter T. Abel,
By Parker Cook
Attorney.

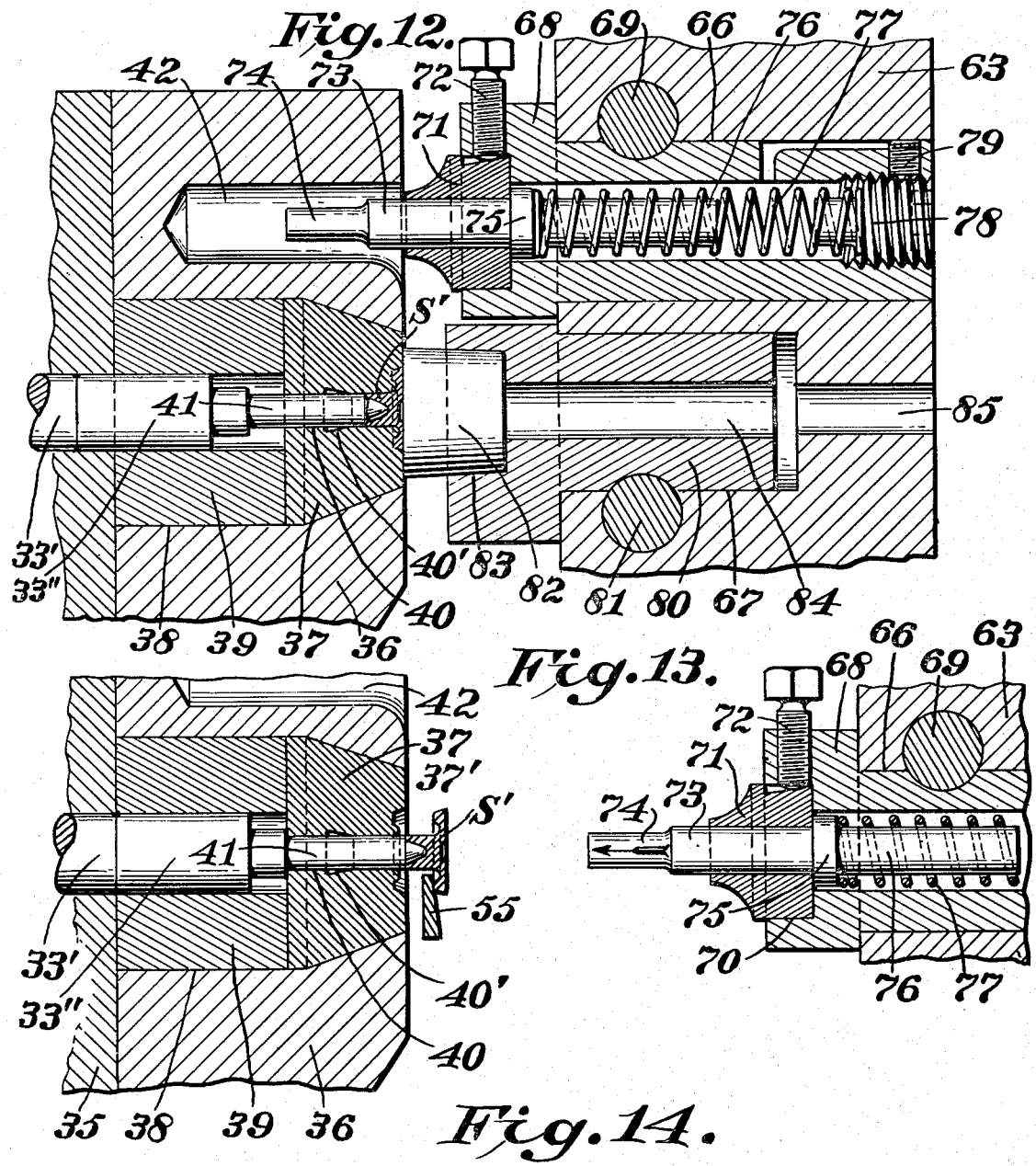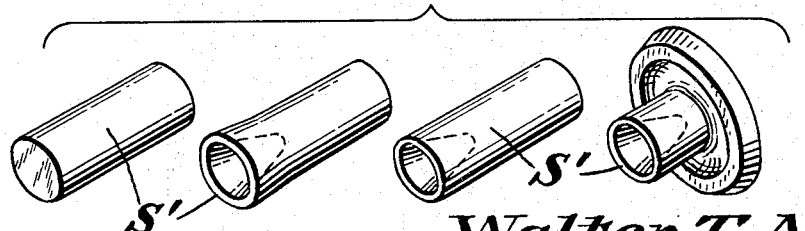

Patented May 26, 1936

2,042,375

UNITED STATES PATENT OFFICE 2,042,375

MACHINE FOR MAKING BUTTON BACKS AND THE LIKE

Walter T. Abel, West Cheshire, Conn., assignor to The Patent Button Company, Waterbury, Conn., a corporation of Connecticut Application December 6, 1933, Serial No. 701,218

23 Claims. (Cl. 79—3)

My invention relates to new and useful improvements in double stroke high-speed crank headers, and more particularly to a crank header for making hard metal (steel) button backs.

One of the principal objects of the invention is to provide what I term a shifting backing-up block, so that the metal acted upon, whether in position for its first stroke, or in position for the second stroke, will be adequately backed up.

Still another object of the invention is to provide means whereby the metal, when receiving its first blow, will be wholly encased within the die cavity and, as before mentioned, will be strongly backed up when in this position. Further, as the metal to be acted upon is forced partly out of the die cavity to receive the header blow, the metal will also be strongly backed up in this position.

Still another object of the invention is to provide means for removing the formed blank wholly without the die cavity and then be automatically ejected or removed from the knock-out pin as the new blank or slug is carried into position.

Still another object of the invention is to provide means whereby the several operations will all be properly synchronized, so that as the one slug is formed and headed and partly removed, another slug will be carried to its work position in order that the operation of the forming of the slugs (button backs) will be continuous.

Still another object of the invention is to provide means whereby the button backs may be formed and removed in a relatively rapid manner, while the stock worked upon is so backed up that there is relatively little wear to the said parts and the button formed will be a clean-cut one.

Still another object of the invention is to provide a forming and backing-up means together with a final knock-out means that are interrelated and cooperative in action, so that the several parts will be advanced and retracted in their desired order with little or no chance for failure.

Still another object of the invention is to provide a machine especially adapted for making steel button backs wherein first the hub portion is indented or flared while the metal slug is wholly within the die cavity. Second, to constrict or relocate the metal and force the slug a sufficient distance out of the die cavity to provide the necessary metal for the heading operation. Third, to head the blank, and fourth, to force the completed button back wholly without the die cavity where it may be ejected at the beginning of the cycle of the next operation.

Still another object of the invention is to provide a shifting backing-up block to receive the thrust from the metal operated on, which block is provided with a lower and an upper cam face, so that whether the slug is in its first position, wherein the hub is flared, or whether it is in its second position, wherein the head is formed, the backing-up block will be in position to properly receive the thrust.

With these and other objects in view, the invention consists in certain new and novel arrangements and combinations of parts, as will be hereinafter more fully described and pointed out in the claims.

Referring now to the drawings,

Fig. 1 is a top plan view of the improved header;

Fig. 2 is a side elevation thereof, with parts omitted for clearness of illustration;

Fig. 3 is an enlarged fragmentary longitudinal sectional view on the line 3—3 of Fig. 1, showing my improved backing-up block and knock-out mechanism in their normal position;

Fig. 4 is a still further enlarged transverse section on the line 4—4 of Fig. 3, showing the shear blade carrier and shear blade in advanced position and showing the slug in line with the die block;

Fig. 5 is a similar view on the line 5—5 of Fig. 3, looking in the opposite direction, and showing the punch carrier mechanism and its elevating means;

Fig. 6 is a fragmentary front elevation of a part of the machine and showing my improved shifting backing-up block in normal position;

Fig. 6a is a detail plan view of the front end of the knock-out pin and the shifting backing-up block in its normal position relative thereto;

Fig. 7 is a fragmentary front view of the shifting backing-up block in an adjusted position to advance the knock-out pin to its first step;

Fig. 8 is a detail plan view, showing the parts in the same advanced position as in Fig. 7;

Fig. 9 is an enlarged fragmentary sectional view showing the punch and header mechanism in an advancing position preliminary to delivering the first stroke or "punch" blow;

Fig. 10 shows the parts with the punch having delivered its first stroke or blow, the slug being now wholly encased within the die cavity when receiving the blow;

Fig. 11 shows the parts after their next step or operation has been performed, wherein the knock-out pin and its operating mechanism have advanced the slug into a protruding position ready for the second or heading blow and the heading die in an oncoming position;

Fig. 12 is a view similar to Fig. 9, but showing the punch carrier mechanism having been raised to align the heading die with the slug and delivering its final or heading blow to complete the button back;

Fig. 13 shows the knock-out pin and its mechanism having been next operated to push the completed button back without the die cavity and the button ejector about to remove the button back from the coned end of the forming pin;

Fig. 14 shows a series of further enlarged views, in perspective, of the slug in its various stages of formation;

Fig. 15 is a fragmentary view similar to Fig. 4, but showing the shear blade and carrier retracted to its normal position and in line with the shear quill;

Fig. 16 is a fragmentary sectional plan view of the shear quill and shear blade and carrier in normal position to agree with Fig. 15.

It might be said at the outset that the double stroke crank header herein illustrated is conventional, as far as the frame and several parts are shown for operating the punch and header die carrier, together with means for elevating the punch and header die carrier. Likewise is the machine conventional as to the female die carrier, feed rolls, and their operating mechanism, as may be seen in the patents to Wilcox, No. 1,360,842 of 1920 and No. 1,405,174, of July, 1922. The present invention relates primarily to a shifting backing-up block and the arrangement of the knock-out pin and the knock-out lever, together with the synchronizing means for operating these parts from the driving mechanism of the machine. It also relates to the manner in which the work is operated on when in the dies, which is made possible by the arrangement and construction of the shifting backing-up block and the arrangement of the knock-out pin and lever.

So that the invention may be fully understood, however, the machine in general is described, and it will be understood that any parts not shown or described have not been thought necessary for a clear understanding of the present invention.

Referring now to the drawings showing a preferred embodiment, and for the moment to Fig. 1 in particular, there is shown a conventional double stroke crank header, consisting of the body 1 and the standards or legs 2. On the forward end of the machine may be seen a feed roll housing 3, in which are located the feed rolls and their operating mechanism, the mechanism, in turn, to be driven through the connecting rod 3ª from mechanism (not shown in detail) connected with the main drive shaft of the machine. This feed roll mechanism per se forms no part of the present invention and any suitable mechanism therefor may be utilized. There is illustrated the rolls A and B for feeding the wire or stock to the machine, which wire or stock S, it will be understood, is to be sheared into lengths (blanks or slugs) and formed into button backs.

Directly on the forward face of the feed roll housing 3 is the adjusting screw bracket a spaced from the housing a suitable distance by the sleeves b through which, in turn, are passed the extension bolts c, which extend entirely through the feed roll bracket and are threaded into the body of the main frame 1 of the machine. The bracket a is held tightly in position by the nuts d on the outer ends of the extension bolts c. Also, there may be seen in Fig. 1 the die carrying block 4, which is rigidly mounted within the body or frame 1 of the machine, while opposed thereto may be seen the punch and header carrying mechanism 5, vertically and slidably mounted on the front face of a horizontal slide or gate 59, which gate is mounted in the ways 59'.

There is also illustrated a drive shaft 6 arranged transversely of the machine, which is driven from any suitable source of power by a belt 7, which passes over one of the two fly wheels 8. Mounted centrally of the shaft 6 is the pitman 9 for operating the aforementioned gate 59. A transversely mounted rock shaft 10 may also be seen which, in turn, is operated through the gear train 11 and 12, which latter gear is mounted on a pintle 13 which, in turn, carries a cam 14 actuating a further pitman 15, which carries the hardened rollers 16. The other end of the pitman is connected to a rocker arm 17 pivoted to a block 17' yieldingly mounted between the springs 18, which springs are carried by the pitman 15. This rocker arm 17 is affixed to the aforementioned rock shaft 10. Also mounted on the rock shaft 10 is a further arm 19 pivotally connected to the cradle 20 which, in turn, has a sliding engagement with the foot 21 of the punch slide supporting plate 22 of the punch carrying mechanism 5 for giving the necessary vertical movement to the punch slide.

It will be understood that the parts above set out are conventional and do not form the gist of the present invention. However, the mechanism now about to be described in cooperation with these parts is what constitutes the present invention.

*Shifting backing-up block and operating mechanism therefor*

Referring now to the gist of the invention, the rock shaft 10 also has another arm 23 (Fig. 3) to which is pivotally connected the rod 24. The other end of the rod 24 is connected through the medium of a shear pin 24' to a sleeve 24'', to which latter, in turn, is pivotally connected the bell crank lever 25.

This bell crank lever 25 is pivotally mounted on a bracket 26, which latter is mounted on the under side of the feed roll housing 3. The short arm 25' of the bell crank is connected to the vertical rod 27 through a universal joint 28. The upper end of the vertically disposed rod 27 is, in turn, pivotally connected to a second bell crank 29 through a similar universal joint 28'. This bell crank 29 is pivotally mounted on the feed roll bracket 3 by the stud 30, while fixed to the upper end of the bell crank arm is the shifting backing-up block 31, which is shown in detail in Figs. 6, 6a, 7, and 8.

Now this backing-up block has the inclined or cam surface 32 which, as will be explained, provides the necessary advance for the knock-out pin 33. The front end of this pin is mounted in a hardened sleeve 34 within the housing 3 and extends horizontally through the frame 1.

It will be noticed from Fig. 3 that the knock-out pin 33, in reality, is made up of several sections, to wit, 33, 33', and 33'', the latter section being a relatively short one for sake of convenience, which section extends within the die block 36 to contact with the headed end 41 of the forming and knock-out pin 33—41. One of the main purposes of having the knock-out pin in several sections is so that a knock-out lever 43, shortly to be described, may be interposed intermediate two of the sections to advance the forming and knock-out pin 33—41 to its final or knock-out step, as will hereinafter be explained.

Threaded within the bracket a will be seen the adjusting screw 31', which is to be locked in a set position by the lock nut 31''. This adjusting screw is to back up or take the thrust that will be delivered through the knock-out pin to the shifting backing-up block 31, which latter will always be in a backing-up position, regardless of the position of the shifting backing-up lever.

Still referring to Fig. 3, there will be seen a backing plate 35 mounted in the frame 1 of the machine, which supports the die block 36 in which is fitted a female die 37. It is also to be noted that the plate 35 and the die block 36 are provided with registered openings, through which pass the sections 33' and 33'' of the knock-out pin 33. As before mentioned, by forming the knock-out pin with the short section 33'' the forming pin may be easily removed and replaced, as it wears in service.

In the foot 35' of the backing plate 35 may be seen screw means 35'' for vertically setting the die block 36 with its die 37 therein.

The die block 36 is also provided with a chamber 38 in which may be seen the backing or filler 39, which is coextensive with the rear surface of the die 37. This die is provided centrally with a bore 40 to receive the forming and knock-out pin 33—41, the rear end of which bears against the small section 33'' of the knock-out pin 33. It will be understood that this forming and knock-out pin 33—41, besides flaring and recessing the hub portion of the slug, is also designed to advance within the die 37 to push the slug partly from the die for its heading position and will finally be advanced by the knock-out lever to completely remove the slug from the die, as will be hereinafter more fully described.

Also formed in the die block above the die 37 is a small clearance or recess 42, into which a punch 73 may enter when the punch is in its raised position, as will also hereinafter be shortly described.

As heretofore mentioned, interposed between two of the sections of the knock-out pin may be seen one end of the knock-out lever 43, which lever is pivoted on the stud 44 (Fig. 1) while its other end 43' extends into the path of a knock-out slide 45 which, in turn, operates within the bearing 46 and is suitably pivoted to a connecting rod 47, which latter extends rearwardly and is suitably operated by a cam 48 mounted on the shaft 48'. The purpose of this knock-out lever is that after the knock-out pin has been advanced from its normal position to the first step and it is then desired to push the button blank or slug from the die, the knock-out lever comes into operation to still further advance the forming and knock-out pin 33—41 through the sections 33' and 33'' (see Figs. 1 and 13) to thus advance the finished slug wholly without the die cavity.

Now referring to Figs. 1 and 2 for the moment, there are illustrated the conventional feed rolls A and B, while leading thereto and therefrom may be seen the guide tubes or quills 49 and 49' through which the wire stock S is fed to the rolls, and then from the rolls through a shear quill 50 mounted in the die block 4 to finally abut or contact with the stop 51 supported by the block 52. This block 52 is suitably adjustably mounted in the main frame 1. Now slidably mounted within this block 52 may be seen a shear blade carrier 53 with the blade 53', which blade has a suitably formed pocket on its nose to receive the slug S', which slug is held in place by the small leaf spring 54, which is carried by the knife and temporarily serves to hold the slug S' after having been severed and carried in the pocket of the shear blade.

In Fig. 4, the shear blade and carrier are shown as having moved from normal position to operated position and as having carried the stock (which is now in the form of a cylindrical slug or blank S') from the quill 50 to a position in alignment with the dies in order that the slug may be pushed wholly within the die 37 and there receive its first stroke or hub forming blow. Also formed on the advancing end of the shear blade carrier 53 may be seen an ejector finger 55, which is, of course, arranged in advance of the plane of the stock, and it is this finger that removes the finished slug from the end of the forming and knock-out pin 41, as will be explained more in detail.

The shear blade carrier or slide 53 is operated by a cam and roller slide 56 which, in turn, is operated from a suitable connecting rod 57, which latter, in turn, is operated by the crank arm 58 mounted on the shaft 13, on which, it will be remembered, is also mounted one of the gears 12 of the gear train 11 and 12. Thus, it will be seen that the movement of the shear blade carrier 53 as well as the movement of the knock-out lever 43 and the timing mechanism for the knock-out pin 33 are all either controlled directly or indirectly from the rotative movement of the main drive shaft.

Punch carrying mechanism

Referring now to the punch carrying mechanism 5 for forcing the metal within the die 37 and about the forming and knock-out pin 33—41 to form the hub portion of the button back, as well as to perform the second or heading operation, there will be noticed in Fig. 3 a fragmentary portion of the horizontal slide 59, on the front face of which is vertically slidably mounted the punch carrying mechanism 5. For this movement, there are provided the jibs 60 which fit within the ways 61. There is also a punch slide 62 and the punch holder 63, which latter is securely bolted to the slide 62 by the locking studs 64 and 64'. The punch holder 63 has receptive slots for the locking studs 64 and 64' to permit of fine adjustment of the punch or punches. There may also be seen in Figs. 1 and 5 the two limiting stop screws 65, one of which limits the upward movement of the slide and the other of which limits the downward movement. Also, there may be seen in Fig. 5 adjusting screws 64ᵃ for lateral adjustment of the upper end of the punch carrier and the further adjusting screws 64ᵇ for adjusting laterally the lower end of the punch carrier.

The punch carrying mechanism 5 includes the elongated block 63 which is provided with bores 66 and 67 in which there are respectively mounted the punch and the heading die. As will be noticed in the upper bore 66, there is positioned a sleeve or bushing 68, which is held rigidly and accurately in position by a tapered bolt 69 arranged transversely thereof and engaging a recess formed in the punch holding sleeve 68. In the forward end of the sleeve 68, there is provided a chamber 70 in which fits the hardened collar 71, which is slightly tapered outwardly to fit within the tapered chamber 70 and is held in position by the set-screw 72. This collar 71 forms an elongated bearing surface for the punch 73 and also provides means for permitting the quick removal of the punch 73 after the same has become worn and has to be replaced. This punch 73 is of hardened steel and its forward end 74 is slightly reduced to conform to the diameter of the stock upon which it operates.

About centrally of the punch 73, there is an enlarged annular head 75 to limit its outward movement. The punch extends rearwardly from the head 75, as at 76, and about which latter portion is located one end of the coil spring 77, which spring is mounted in the bore of the sleeve 68 and bears at its forward end against the head 75 and at its rear end against the screw-threaded stop 78, which latter is provided to minutely regulate the distance that the punch 74 will enter the die 37.

From this, it will be seen that the punch 73 is normally held with relation to the block 62 in its forward or advanced position. In Fig. 9, I have shown the punch carrying mechanism with its punch advanced to a position where it is just contacting with the end of the slug S' preliminarily to forcing it into its position wholly within the cavity of the die 37, where it will receive its first or forming blow by the continued movement or stroke of the punch, which has now been arrested in its movement. As the punch carrying mechanism advances and the spring tension is overcome, the punch 73 having its rear end 76 now abutting against the pin 78 will force the slug over the coned end 41 of the forming pin 33 within the die cavity 40', as may be seen in Fig. 10, thus flaring the slug and properly indenting the same.

Still referring to Fig. 9, there will be noticed a further sleeve 80, which tightly fits within the bore 67 and is locked in position by the tapered bolt 81 similar to the manner in which the upper sleeve is held in position. In the forward end of this sleeve is carried the header punch 82, the body of which is slightly tapered and ground to provide a gripping fit within its carrying chamber 83 within the sleeve 80. It will also be noticed that centrally of the sleeve 80 there is a longitudinal bore 84 which registers with the bore 85 in the punch carrying block 62 to provide a passageway, in which may be placed a rod to force out the header punch 82 when desired.

In Figs. 9 to 13, inclusive, are shown the progressive steps of the punch carrying mechanism and the cooperating female die carrying block and the forming and knock-out pin, while Fig. 14 shows a group of enlarged perspective views illustrating the progressive steps of the slug formation from the slug proper to the formed button back.

Specifically, in Fig. 9, it will be noticed that the punch has just come into contact with the end of the cylindrical slug S', while the knock-out pin 33—41 is held in its final position of the preceding cycle ready to be forced back to its normal or first position by the oncoming slug. In Fig. 10, the punch 73 is shown as having advanced and struck or delivered the first blow upon the slug to force the metal about the forming pin and into a slightly flared cavity 40' within the die 37 to form the hub cavity, it being understood that the forming and knock-out pin 41 has been forced back to its normal position where it is backed up by the knock-out pin 33—33'—33".

In Fig. 11, the punch 73 is to be understood as having receded while the forming and knock-out pin 41 has been advanced by its first step action to push the now partly formed slug outwardly a sufficient distance to provide stock for the head portion of the button back and ready to receive the next or heading blow. It will also be understood that the punch carrying mechanism 63 has been raised to bring the header punch 82 into proper alignment with the die 37 and its forming and knock-out pin 33—41, and is also advancing to deliver the heading blow. It will further be noticed that the advancement of the forming and knock-out pin relocates the metal of the previously flared indented slug about the conical end of the forming pin as the slug is forced outwardly through the bore of the die.

The next progressive step is shown in Fig. 12, that is, the header punch 82 has delivered its heading blow and driven the protruding metal of the stock in the die cavity 37' to complete the heading of the slug S', thus forming the button back. It will be understood, of course, that the punch 74 in the punch carrying mechanism has been raised in unison with the heading punch, so that the punch will be raised into alignment with the recess 42 to enter therein (merely for clearance) as the heading blow is delivered.

The final step in the operation is shown fragmentarily in Fig. 13, in which the forming and knock-out pin 41 has advanced to its final or knock-out position to force the completed slug S' wholly without the die and in position to be removed from the coned end of the forming and knock-out pin 33—41 by the advance of the shear knife carrier 53 for its succeeding cutting and transfer operation, which shear knife carrier 53, it will be remembered, carries the ejector finger 55. The punch carrying mechanism 5 will have receded and lowered and started to advance the punch, the punch now being in line with the die and forming and knock-out pin 41, and in a position to force a freshly cut slug into the die as it further advances to the position shown, for instance, in Fig. 9.

Operation of the machine

Now that a general description has been set out of the conventional part of the machine, as well as a specific description of the novel features of my invention, a cycle of the machine to form a button back from the wire stock will be set out briefly.

Assuming that the machine has been started and run by a suitable motor through a belt on the fly wheel 8, the wire stock S will be advanced through the feed rolls A and B and the quills 49 and 49' to abut against the stop 51, which has been set to properly determine the length of the slugs for the button backs or other articles to be formed.

It will be remembered that the shear blade carrier 53 is operated from a roller and cam 56, which cam is operated from the connecting rod 57 mounted eccentrically on the stub shaft 58 and driven from the reduction gears 11 and 12 which, in turn, are driven, it will be remembered, from the main shaft 6. After the stock is sheared by the shear blade 53', the slug S' will be held in the pocket on the forward end of the shear blade 53' by the spring 54. The slug is then carried transversely of the machine into alignment with the die 37 and the punch 73. Now the shear blade and its carrier remain momentarily at rest while the stock is still in alignment. The gate 59 next advances sufficiently to cause the punch to engage the end of the slug and push the same wholly within the die, which slug, in turn, bearing against the forming pin restores the same and pushes the sections of the knock-out pin back against the lower face of the shifting backing-up block 31, which is now in its normal position.

By the above movement, the knock-out lever 43 will also be returned to a normal position and ready for its next operation. The completion of the first stroke of the punch mechanism drives the punch 74 forward to its limit to complete the formation of the cavity or hub portion of the button back by driving the metal about the coned end 41 of the forming pin 33. It is to be especially noticed that the thrust of the blow is taken up by the shifting backing-up block 31, it also being noticed that the knock-out pin 33 now bears against the low portion of the cam face 32 of the shifting backing-up block 31, which shifting backing-up block is always in contact with the locked adjusting screw 31' to be backed up thereby.

After the first blow is delivered, the gate recedes, and again on its advancement to deliver the heading blow and coincident therewith, the main drive shaft 6 will, through the reduction gearing 11 and 12 and the cam and roller action 14 and 15, impart a motion to the rock shaft 10 through the lever 17. This will rock the shaft 10, which latter carries the cradle arm 19 to thus elevate or raise the punch carrying mechanism 5 for its second or heading blow, as illustrated in Figs. 11 and 12.

Now at the same time that the punch mechanism 5 is elevated, the shifting backing-up block 31 is operated from its normal position to its first advanced position through the arm 23, connecting rod 24, bell crank 25, and the vertically connecting rod 27.

It will also be understood that the shifting backing-up block 31, in moving from the normal position to its first advanced position, through the provision of its cam face, will cause the knock-out pin 33 and its several sections to advance to the position as shown in Fig. 11 to thus force the slug partway out of the female die 37. The amount that the slug protrudes provides the metal required for the head of the button back. In forcing this slug partly out of the die, the flared metal of the slug will be rearranged about the coned end of the forming pin.

It will be seen that the thrust (in this instance heading operation) is also taken up through the knock-out pin by the shifting backing-up block which, it will be remembered, has moved to its advanced position. The end of the knock-out pin, of course, now bears on the high portion of the shifting backing-up block, as seen in Fig. 8. The gate then recedes with its punch and heading die, and as it recedes it will be lowered to its normal position by the movement of the rock shaft 10 and its connections. While lowering, however, the cam 48 timed from the main drive shaft will cause a forward movement of the rod 47 to, in turn, actuate the knock-out lever 43 which, it will be remembered, has its opposite end interposed intermediate the sections of the knock-out pin 33. As this lever 43 is shifted to advance the sections 33' and 33" and the forming and knock-out pin, the now completely formed button blank or slug is forced to the position clearly illustrated in Fig. 13. In other words, the button blank or slug is wholly removed from the die but remains supported on the cone-shaped end of the forming and knock-out pin 33—41.

The movements just described complete the cycle of operation. On the succeeding cycle, however, the forward movement of the shear blade carrier 53 and shear blade 53' to sever and present a fresh slug to the dies will, through the ejector finger, arranged in advance of the nose of the blade 53', engage under the flange of the button back to effectively eject or knock it off the coned end, so that as the cycle is continued, the now completed slug will be eliminated (dropped into a proper receptacle) and the die free to receive the next oncoming slug.

The machine is designed to deliver about one hundred and sixty blows a minute to thus produce about eighty button backs per minute, it being remembered that it is a two-blow header.

From the foregoing, it will be seen that I have devised a simplified form of forming and knock-out mechanism that permits of a more rapid operation in the making of button backs from wire slugs and provides means for taking up the thrust of both the forming and heading blows.

The arrangement shown also permits the hub of the blank or slug to be formed while wholly within the female die and forces the slug sufficiently outward to receive its final or heading blow.

Also, by the arrangement shown, there is no necessity of a high vibratory reciprocation and rotary movement of the dies.

It will be understood that it would be clearly within the scope of the invention to provide the shifting backing-up block with three faces rather than with two and to change the cam operating mechanism, so that there might be an additional blow, that is, making the machine a three-blow header and backing up the slug during all of its blows.

Also, the machine may be used for forming rivets and the like by substituting suitable dies.

Having thus described my invention, what I claim as new and desire to secure by Letters Patent is:—

1. A double stroke crank header for forming button backs and the like from slugs and including a punch and a header die, means for operating the punch and the header die to impart successive forming and heading blows to a slug, a forming and knock-out pin cooperating with the slug during both blows, means for advancing the forming and knock-out pin to advance the slug after receiving the forming blow, means for backing up the forming and knock-out pin during the two blows received by the slug, additional means for advancing the knock-out pin carrying the completed button back, and means for removing the button back from said pin.

2. A double stroke crank header for forming button backs and the like from slugs including means for cutting the slug to the desired length, a punch and a header die and means for operating the same, a die cavity for receiving the slug, a forming and knock-out pin, the punch and pin operating on the slug when wholly within the die cavity, means for backing up said pin during this first stroke of the header die, shiftable means for advancing the forming and knock-out pin to advance the slug to be headed, the shiftable means through the pin backing up the slug while being headed, means intermediate the ends of the knock-out pin for removing the completed slug from the die cavity while carried by the forming pin, and means for removing the slug from the forming pin.

3. A multiple stroke crank header for forming button backs and the like from slugs including a receiving die, a punch and a header, a forming and knock-out pin extending within the receiving die, means for delivering the slug to the receiving die, means for operating the punch while the slug is wholly within the receiving die to indent the end, means for advancing the knock-out pin to, in turn, advance the slug to a position partly without the die, means for heading the slug while the latter is in this position, additional means for removing the slug from the die, and further means for ejecting the completed slug while in a position without the die.

4. A multiple stroke crank header for forming button backs and the like from slugs including a receiving die, a punch and a header, a forming and knock-out pin extending within the receiving die, means for aligning the slug with the receiving die whereby the initial movement of the punch may force the slug within said die, a continuing movement of the punch causing a forming of the end of the slug by the pin while the slug is wholly within the receiving die, means for advancing the knock-out pin to in turn relocate the metal of and advance the slug to a position partly without the die, means for heading the slug while the latter is in this position and the advancing means for the knock-out pin backing up the slug while in this latter position, means intermediate the ends of the knock-out pin for pushing the slug from the die while still carried on the knock-out pin, and final means for ejecting the completed button back from the said knock-out pin.

5. A crank header for forming button backs and the like from cylindrical slugs including a die, a forming pin extending therein, means for forcing the slug over the forming pin while the slug is wholly encased within the die, means for advancing and backing up the slug, and means for heading the advanced slug while in the backed-up position, means for further advancing the slug without the die, and means for removing the slug from the forming pin.

6. A double crank header for forming button backs and the like from cylindrical slugs including a die having a forming pin advanceable therein, means for forcing the slug wholly within the die and over the forming pin, shiftable means for advancing the forming pin and pushing out the slug to a second position to be headed and relocating the metal in the slug while being advanced, said means backing up the forming pin while the slug is being headed, means for heading the slug, and further means for removing the slug from the die and forming pin and cutting a further cylindrical slug.

7. A double crank header for forming button backs and the like from cylindrical slugs, a die having a forming pin advanceable therein, means for forcing the slug wholly within the die and over the forming pin, a shiftable cam face advancing the forming pin and ejecting the slug partly without the die to be headed, said cam face backing up the forming pin while the slug is being headed, means for shearing the slugs to a proper length, and means carried by said means for removing the slug from off the forming pin.

8. A machine for making button backs and the like including a female die, a forming pin extending inwardly from the rear of the die, a punch adapted to operate on a slug while wholly within the die cavity and to force a part of the slug around the forming pin, means for forcing the slug partway out of the die, means for completing the forming of the slug, means for advancing the forming pin to back up the slug while being completed, and means for operating the forming pin to remove the finished slug from the die.

9. An attachment for a double stroke crank header including a female die, a forming and knock-out pin extending within the die, means for forcing the slug wholly within the die and forming a hub in the slug, means for ejecting the slug partway out of the die to be headed and to back up the slug while being headed, means for heading the slug, and supplemental means interposed intermediate the ends of the forming and knock-out pin for forcing the completed slug wholly without the die.

10. A machine for forming slugs into button backs and the like including a female die and means for forcing the slug wholly within the die, means extending rearwardly from the die to back up the slug, cam means for ejecting the slug partly without the die to be headed and to back up the slug while being headed, means for heading the slug, and means interposed midway the advancing means for finally removing the completed slug from the die.

11. A double stroke crank header including a female die, a punch for forcing the slug wholly within the die and oppositely located advanceable means for forcing the slug partway out the die to be further acted upon and for backing up the slug when further acted upon, means for heading the slug when extending partly without the die, and means intermediate the advanceable means and synchronized with the punch for removing the completed slug from the die after being headed.

12. A machine for forming button backs and the like including a forming and knock-out pin, a female die receiving at its rear the forming pin, a shiftable lever having a cam face thereon for advancing the forming and knock-out pin, means for heading the slug, and means interposed between the ends of the forming and knock-out pin for finally moving the forming pin to push the headed slug from the die.

13. A machine for forming button backs and the like from wire stock including a female die having a bore extending therethrough, a forming and knock-out pin advanceable in said die from the rear thereof, means for advancing the pin from its normal to its first position, means intermediate the forming pin and said means for shifting the knock-out pin to its final position, and a heading die cooperating with the female die.

14. A machine for forming button backs and the like including a female die having a bore extending therethrough, a forming pin normally resting in the rear of the bore, means for backing up the forming pin when in this position, means for advancing the forming pin within the bore and to back up the same while in a second position, supplemental means for advancing the forming pin so that its nose will extend without the bore of the die, and a male die cooperating with the female die.

15. A double stroke high-speed crank header including movable forming and heading dies and a forming and knock-out pin, means for advancing the forming and knock-out pin after a stroke of the forming die, and supplemental means for further advancing the forming and knock-out pin after the second or heading stroke.

16. The method of forming tubular structures which comprises confining a blank in an extruding die in engagement with a pair of working tools, one of which is adapted to extrude the material of the blank within the die, providing clearance greater than the normal internal diameter of the die, immediately adjacent the operating end of the extruding tool, compressing said blank between said tools thereby to effect an extruding displacement of the material of the blank by molecular flow around the extruding tool and at the point of clearance, advancing the extruded blank in the die to project a portion thereof from the die, and swaging a head on said projected portion.

17. The combination with a die having a passage therethrough adapted for reception of a correspondingly formed blank, and an internally recessed portion effective to provide limited clearance laterally of the passage, of means positioned with respect to the die for confining the blank to said passage with the inner end of the blank extending into said recessed portion, an extruding tool adapted for insertion into the passage to engage said inner end of the blank, and means for relatively feeding said confining means and extruding tool toward each other, said tool and recessed portion being so proportioned relatively as to effect a predetermined extrusion of the metal of said body within said recessed portion of the die, as said confining means and tool are relatively fed.

18. A cold header for forming tubular structures, comprising a die having an opening for the reception of a metallic body, means to sever a metallic body from a supply and feed the severed body into alignment with the die opening, an extruding tool arranged to enter the die, a punch having a portion engageable with the severed metallic body and effective to force said body into engagement with the extruding tool, within the die, and means for moving said punch toward said tool thereby to position the metallic body within the die and to extrude the same around the extruding tool, said die opening having an internal enlargement, so proportioned relative to said extruding tool as to accommodate a limited flow of metal of said body during extrusion thereof.

19. A cold header for forming tubular structures comprising a die having an opening for the reception of a metallic body, an internally recessed portion effective to enlarge the normal diameter of the opening and provide a clearance space laterally thereof, an extruding tool arranged to enter the die with its end projecting into said recessed portion, a pair of punches each having a portion selectively engageable with the metallic body; means for moving one of said punches toward said tool thereby to extrude the metallic body at the point of clearance, means for thereafter separating said tool and said punch from each other, means including said tool to advance the body within the die to project a portion of the body from the die, means for shifting said punches until the second punch is aligned with the body, said moving means being thereafter effective to provide relative movement between said second punch and the projected portion of the body whereby to form a head thereon.

20. A cold header for forming tubular structures comprising a die having an opening for the reception of a metallic body, means to sever a metallic body from a supply and feed the severed body into alignment with the die opening, an extruding tool arranged to enter the die, a punch having a portion engageable with the severed metallic body and effective to force said body into engagement with the extruding tool, within the die, means for moving said punch toward said tool thereby to position the metallic body within the die and to extrude the same around the extruding tool, said die opening having an internal enlargement, so proportioned relative to said extruding tool as to accommodate a limited flow of metal of said body during extrusion thereof, and means operative thereafter for forming a head on said metallic body.

21. A cold header for forming tubular structures comprising a die having an opening for the reception of a metallic body, and an internally recessed portion effective to enlarge the normal diameter of the opening and provide a limited clearance space of predetermined location within the die; an extruding tool arranged to enter the die with its tip projecting into said recessed portion; a punch having a portion engageable with the metallic body and effective to force said body into engagement with the extruding tool, and means for moving said punch toward said tool, said tool and recessed portion being so proportioned relatively as to effect an extrusion of the metallic body at the point of clearance.

22. A cold header for forming tubular structures comprising a die having an opening for the reception of a metallic body, means to sever a metallic body from a supply and feed the severed body into alignment with the die opening, an extruding tool arranged to enter the die, a punch having a portion engageable with the severed metallic body and effective to force said body into engagement with the extruding tool, within the die, and means for moving said punch toward said tool thereby to position the metallic body within the die and to extrude the same around the extruding tool, said die opening having an internal enlargement, so proportioned relative to said extruding tool as to accommodate a limited flow of metal of said body during said extrusion, and advance mechanism for thereafter moving the extruded body relative to the die, for subsequent operations.

23. A cold header for forming tubular structures comprising a die having an opening for the reception of a metallic body, means to sever a metallic body from a supply and feed the severed body into alignment with the die opening, an extruding tool arranged to enter the die, a punch having a portion engageable with the severed metallic body and effective to force said body into engagement with the extruding tool, within the die, and means for moving said punch toward said tool thereby to position the metallic body within the die and to extrude the same around the extruding tool, and advance mechanism for thereafter moving the extruded body relative to the die, for subsequent operations, means including said tool for knocking out the extruded body, and means for stripping said body from the extruding pin.

WALTER T. ABEL.